United States Patent [19]

Chiao et al.

[11] Patent Number: 4,574,690
[45] Date of Patent: Mar. 11, 1986

[54] APPARATUS FOR FORMING WRAPPED FOOD PRODUCTS

[76] Inventors: Tsu T. Chiao; Cherry C. Chiao, both of 2325 Holly Oak Dr., Danville, Calif. 94526

[21] Appl. No.: 630,377

[22] Filed: Jul. 13, 1984

[51] Int. Cl.⁴ ............................................. A47J 37/12
[52] U.S. Cl. ........................................ 99/353; 99/407; 99/450.6; 99/450.7; 425/133.1; 425/308; 426/283; 426/523
[58] Field of Search ................ 426/283, 523; 425/296, 425/133.1, 307, 308; 100/93 S; 99/450.6, 450.7, 352, 353, 405, 406, 407, 355, 356

[56] References Cited

U.S. PATENT DOCUMENTS

| | | | |
|---|---|---|---|
| 1,265,853 | 5/1918 | Wiseman | 425/133.1 |
| 1,271,406 | 7/1918 | Winfrey | 425/133.1 |
| 1,933,557 | 11/1933 | Kalvin | 425/133.1 |
| 2,532,131 | 11/1950 | Van Voorst | 425/133.1 |
| 2,695,571 | 11/1954 | Kalmeijer | 425/308 |
| 3,225,718 | 12/1965 | Page | 425/308 |
| 3,768,171 | 10/1973 | Bird | 100/93 S |
| 3,778,209 | 12/1973 | Wallace | 425/133.1 |

FOREIGN PATENT DOCUMENTS 1119118  6/1956  France ................... 99/353

Primary Examiner—Billy J. Wilhite
Attorney, Agent, or Firm—Paul Davis

[57] ABSTRACT

An apparatus and process for continuously producing a co-extruded wrapped food product is disclosed. The apparatus includes a double nozzle extruder member having inner and outer tubular barrels arranged with the inner barrel being positioned centrally within the outer barrel. First and second hoppers are adapted to supply a filling food material and a moldable food material to their respective barrels. Feeding means continuously move the two food materials from each of their hoppers through the barrels to form a filled ribbon of food material. Means is included for continuously shaping, cutting and sealing the ribbon to form the wrapped food product in a single step and without any waste. The shaping, cutting and sealing means is adapted to receive the ribbon of food material and continuously produce the final wrapped food product. The wrapped food product is then either continuously frozen or continuously cooked to the desired level in a cooker which completes the continuous process for partially or completely cooking the wrapped food product.

2 Claims, 11 Drawing Figures

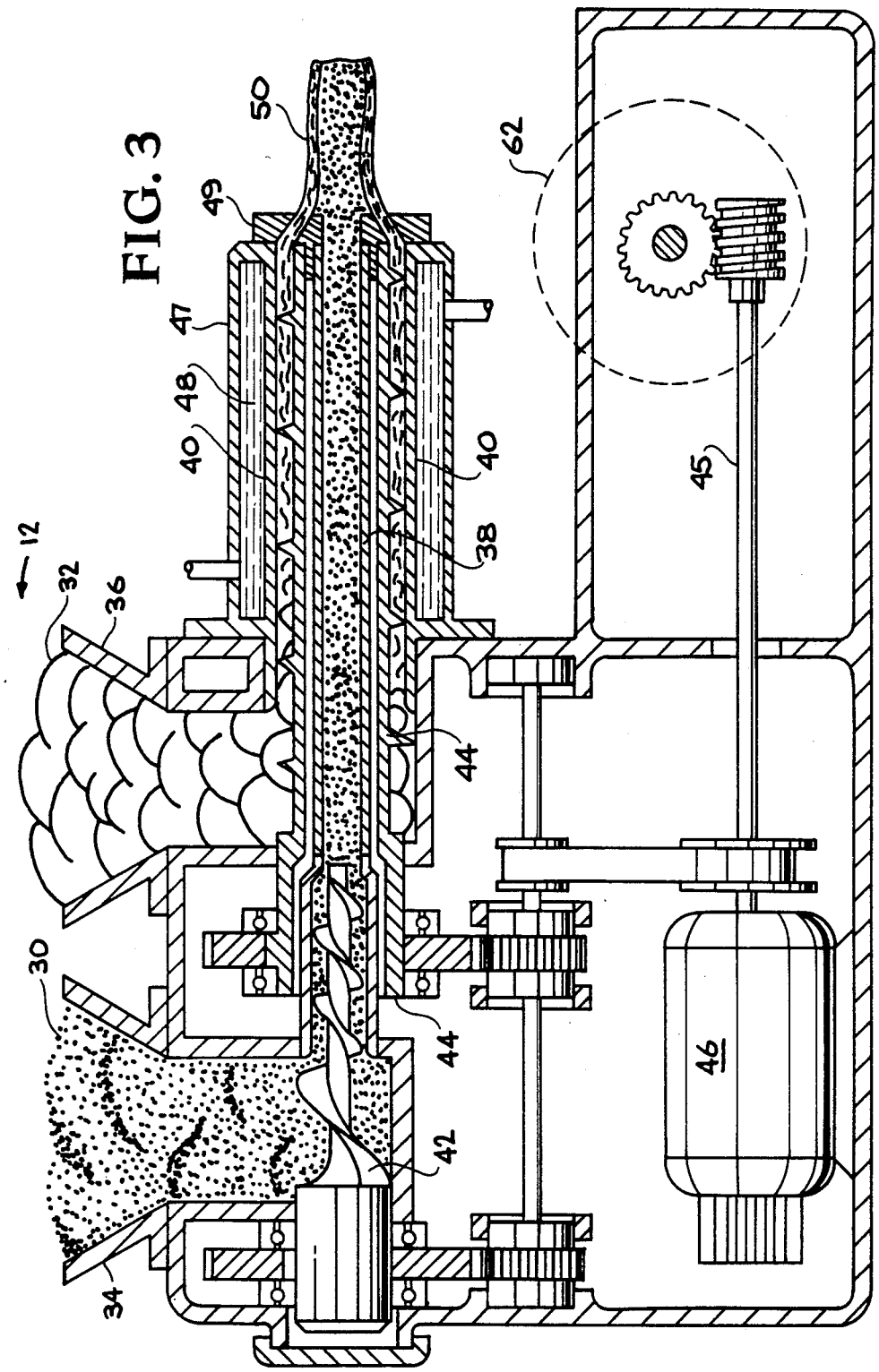

APPARATUS FOR FORMING WRAPPED FOOD PRODUCTS

BACKGROUND OF THE INVENTION

This invention relates generally to an apparatus for forming wrapped food products which continuously produces the product, and more particularly to a double extrusion apparatus.

Food products having a central filling material including but not limited to Chinese "pot stickers", tamales, ravioli, dumplings, pierogi, filled donuts, soft center candies, and the like, are well known. Numerous devices have been developed in an attempt to produce such products quickly and efficiently.

U.S. Pat. No. 4,251,201, dated Feb. 17, 1981 to Krysiak discloses an extrusion apparatus useful for the production of such a food product. This apparatus includes inner and outer conduits through which materials are extruded toward an iris valve. Food material is sequenced through a conduit operatively connected to the iris valve, wherein the food product is formed. Movement of the iris valve to open and closed positions is sequenced by an assembly which controls movement of the food material to the valve. In this regard, the apparatus fails to provide for continuous formation of a wrapped food product.

U.S. Pat. No. 3,778,209, dated Dec. 11, 1973 to Wallace et al, discloses a machine for producing food products having an extruded filler material and an extruded outer covering. Included is a means for intermittently stopping the flow of the filler product in such a manner that uniform, intermittent extrusion is maintained; and for slicing the extruded outer material between portions of the intermittently extruded filler material. A conveyor belt and wheel with cutting blades are provided. The final food product is formed by intermittently stopping extrusions, and cutting resultant food ribbon to form the desired end product.

Other known apparatus for producing food products include: U.S. Pat. No. 3,234,869, dated Feb. 15, 1966 to Poranbo; U.S. Pat. No. 3,316,833, dated May 2, 1967 to Williams et al; U.S. Pat. No. 2,047,262, dated July 14, 1936 to Gibson et al; and U.S. Pat. No. 1,647,683, dated Nov. 1, 1927 to Bollinger.

It would be desirable to provide an apparatus for forming wrapped food products continuously, without sequencing or intermittently stopping the flow of extruded food material. It would also be desirable to provide an apparatus and method for forming wrapped food products which continuously extrudes, forms, shapes, and seals the final product without intermittent stoppage. It would be a further advancement to provide an apparatus and method for continuously extruding, forming, shaping and sealing a wrapped food product without any waste, and subsequently provide for continuous cooking (to a desired level of cooking) of the wrapped food product.

SUMMARY OF THE INVENTION

Accordingly, it is an object of the invention to provide an apparatus for forming wrapped food products employing a co-extrusion mechanism.

Another object of the present invention is to provide an apparatus for forming wrapped food products continuously.

A further object of the present invention is to provide an apparatus for continuously cutting, shaping and sealing wrapped food products in a single step operation without intermittent stopping and waste of co-extruded food material.

Another object of the present invention is to provide an apparatus for continuously producing a cooked, wrapped food product.

Additional objects, advantages and novel features of the invention will be set forth in part in the description which follows, and in part will become apparent to those skilled in the art upon examination of the following, or may be learned by practice of the invention. The objects and advantages of the invention may be realized and obtained by means of the instrumentalities and combinations particularly pointed out in the appended claims.

To achieve the foregoing and other objects, and in accordance with the purposes of the present invention, as embodied and broadly described herein, the apparatus for continuously producing a wrapped food product, defined as a filling food material surrounded by a moldable food material, comprises means for forming a co-extruded filled ribbon of food material. Means are included for continuously shaping, cutting and sealing the ribbon to form the wrapped food product. The shaping, cutting and sealing means is positioned adjacent to the means for forming the ribbon of food material and is adapted to receive the ribbon to continuously shape, cut and seal to form the wrapped food product without waste.

In a further aspect of the present invention, tne apparatus for continuously producing a wrapped food product comprises a double nozzle extruder member having an inner elongated tubular barrel arranged substantially centrally within an elongated surrounded outer tubular barrel. A first hopper is adapted to supply the filling food material to the inner tubular barrel, and a second hopper is adapted to supply the moldable food material to the surrounding outer tubular barrel. Feeding means is included for continuously moving the food materials from each of the hoppers through each of the tubular barrels respectively to an end of each of the tubular barrels to form a filled ribbon of food material. Means for continuously cutting, shaping and sealing the ribbon to form the wrapped food product is provided. The cutting, shaping and sealing means is positioned adjacent to the feeding means and adapted to receive the filled ribbon of food material to continuously shape, cut and seal it as a product in a single step and without any waste.

In yet a further aspect of the present invention, in accordance with its objects and purposes, the means for shaping, cutting and sealing the food product comprises a first rotatably mounted cylinder having a cylindrically shaped surface which includes a plurality of wells and an indentation formed around each of the wells. A second rotatably mounted cylinder is positioned adjacent to the first cylinder and adapted to rotate (in an opposite direction relative to the first cylinder) as the first cylinder rotates.

In still another aspect of the present invention, the apparatus for forming the wrapped food product also includes a cooking means comprising top, bottom and side wall members which define a cooking chamber housing a heated cooking solution. An elongated entrance tube extends through the top wall member and into the chamber. The elongated entrance tube is adapted to receive the wrapped food product from the apparatus for forming the wrapped food product, and direct it to a bottom section of the chamber. Means for creating turbulence in the bottom section of the chamber are included, as are means for heating the cooking solution in the chamber. Means for directing a final (either partially or completely cooked) food product out of the top section of the chamber is provided.

The co-extrusion apparatus of the present invention continuously produces a filled ribbon of co-extruded food material. The ribbon is then formed, shaped and sealed in a single step into the wrapped food product without waste. The continuous process produces the wrapped food product without intermittent stoppage of the food materials during co-extrusion, interruption of the cooking process or a stoppage of any part of the overall operation. All of this is achieved with a minimum of machinery, and results in the rapid production of a very high number and large variety of co-extruded wrapped food products continuously and without waste.

DESCRIPTION OF THE DRAWINGS

The accompanying drawings, which are incorporated in and form a part of the specification, illustrate various embodiments of the present invention, and together with the description, serve to explain the principles of the invention.

FIG. 3 illustrates a cross-sectional view of the co-extrusion apparatus of FIG. 2.

FIG. 4b further illustrates a cross-sectional view of the cutting means illustrated in FIG. 4a.

DESCRIPTION OF THE INVENTION

The apparatus of the present invention continuously produces a wrapped food product, defined herein as a product comprising a filling food material surrounded by a moldable food material which is different than the filling food material. Suitable filling food materials include but are not limited to meats, vegetables, fruits, cheeses, nuts, pie fillings, jellies, jams, sugar products, various combinations of them, and the like. Suitable moldable food materials include but are not limited to flour and starch from any grains or root plants such as wheat, rice, potatoes, corn and the like. These materials can be mixed with liquids such as water or oils to produce film-forming sheets to wrap over any filling materials.

Figure 1:
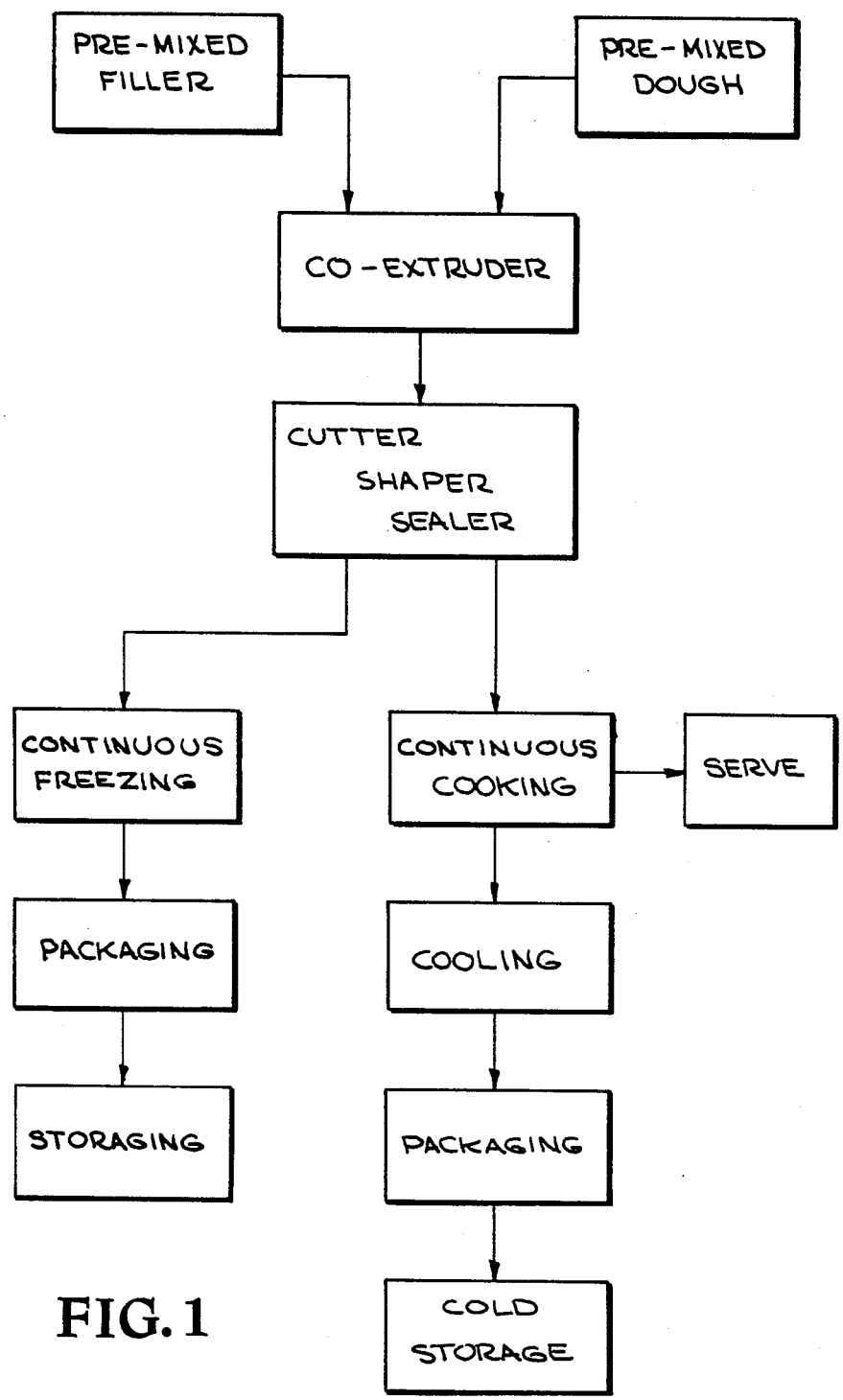
FIG. 1 is a block diagram of one embodiment of the process of the present invention, illustrating co-extrusion of the filler and moldable food materials, cutting, shaping and sealing of the co-extruded filled ribbon of food material, continuous freezing continuous cooking of the final product.

The process of the present invention is illustrated in FIG. 1. Filling food material and moldable food material are co-extruded, cut, shaped and sealed, to form the final wrapped food product continuously. Such wrapped food products include but are not limited to wonton, pot stickers, ravioli, tamalis, filled donuts, and the like. Thereafter, the final food product can be packed frozen or cooked.

Generally, the apparatus of the present invention comprises means for forming a co-extruded filled ribbon of food material. Means is included for continuously shaping, cutting and sealing the ribbon in a single step operation to form the wrapped food product. The shaping, cutting and sealing means is positioned adjacent to the means for forming the co-extruded ribbon and is adapted to receive the ribbon to continuously shape, cut and seal to form the wrapped uncooked food product without any waste.

In one embodiment, a double barrel extruder member having an inner elongated tubular barrel is arranged substantially centrally within an elongated surrounding outer tubular barrel. A first hopper is adapted to supply the filling food material to the inner tubular barrel, and a second hopper is adapted to supply the moldable food material to the surrounding outer tubular barrel. Feeding means is provided for continuously moving the food materials from each of their hoppers and tubular barrels, respectively, to an end of each of the tubular barrels, forming a filled ribbon (in tubular form) of food materials. Means for continuously shaping, cutting and sealing the wrapped food product from the filled tube material is included. The shaping, cutting and sealing means is positioned adjacent to the feeding means and adapted to receive the ribbon of food materials to continuously shape, cut and seal and produce the final wrapped food product in a single step and without any waste. This occurs without intermittent stoppage of the flow of filling or moldable food materials, permitting a continuous production.

FIGS. 2 through 6 illustrate the preferred embodiment of the present invention. The embodiment is not intended to limit the scope of the invention.

Figure 2:
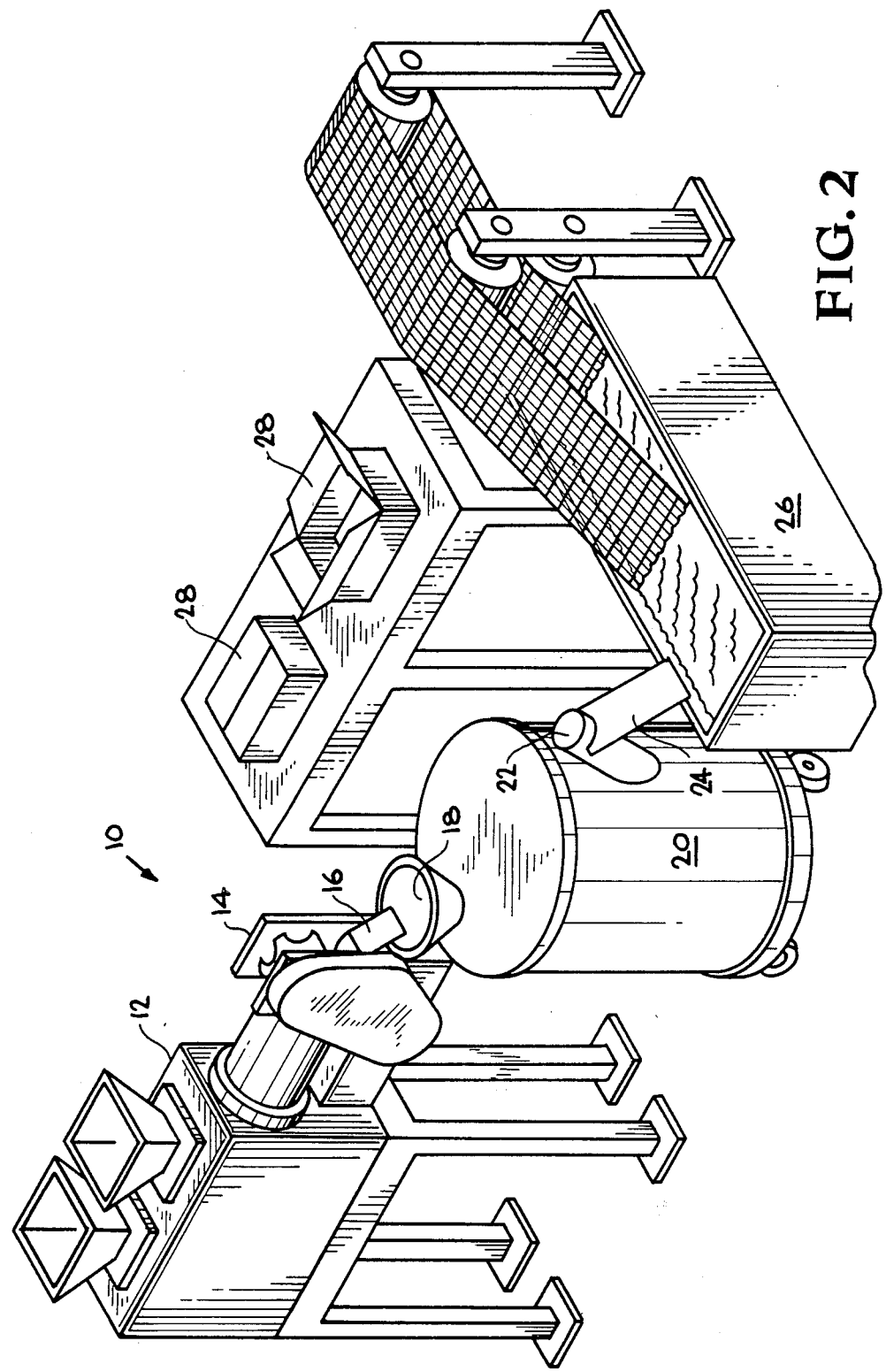
FIG. 2 is a perspective view of one embodiment of an apparatus for continuously producing the wrapped food product, the cooking means, and subsequent packaging.

As shown in FIG. 2, apparatus 10 includes a co-extruder assembly 12, and a cutter-shaper-sealer assembly 14 which produces the wrapped food product. As the wrapped product exits from cutter-shaper-sealer assembly 14, it exits down ramp 16, is received in a cooker inlet port 18, and flows into a cooker 20. The wrapped food product remains in cooker 20 for a predetermined length of time, sufficient to provide the desired level of cooking, and exits therefrom through an exit port 22 where it then flows down a drain ramp 24 and onto a conveyor means 26. Exemplary conveyor means include but are not limited to belt conveyors, inclined water cooling conveyors, and the like.

Drain ramp 24 is positioned adjacent to exit port 22 and conveyor means 26. Included within the design of drain ramp 24 are a plurality of perforations adapted to permit drainage of the cooked food product. From conveyor means 26 the product can then be placed in packaging 28, and removed for storage or freezing, or alternatively can be directed into a continuous freezer where the product continuously enters, becomes frozen and is packaged.

From ramp 16 the uncooked wrapped food product can also be directed into a continuous freezer where the product continuously enters, becomes frozen and is packed uncooked.

Co-extruder assembly 12 is illustrated in more detail in FIG. 3. As shown, filling food material 30 and moldable food material 32 are received and housed in first and second hoppers 34 and 36, respectively. Hoppers 34 and 36 are operatively connected to a co-extruder member comprising an inner elongated tubular barrel 38 arranged substantially concentrically (centrally) within an elongated surrounding outer tubular barrel 40.

Filler food material 30 flows from hopper 34 through tube 38, and moldable food material 32 flows from hopper 36 through tubular barrel 40.

Feeding means continuously move the two food materials from the hopper through each of their respective tubular barrels. Exemplary feeding means include but are not limited to a first screw feed member 42 positioned within inner tubular barrel 38 and adapted to provide for the continuous movement of filling food material 30 through co-extruder assembly 12. A second screw feed member 44 is positioned within tubular barrel 40 and is adapted to provide for the continuous movement (and synchronized with the movement of filling material 30) of moldable food material 32 through co-extruder assembly 12.

First and second screw feed members 42 and 44 are operatively connected to motor means 46 through an assembly of bolts, shafts, gears and belts. A water jacket 47 is positioned adjacent to and surrounds outer tubular barrel 40 and is adapted to flow either a warming or cooling medium 48 around moldable food material 32 as it is fed through co-extrunder assembly 12.

A die or nozzle 49 is positioned at the end of tubular barrels 38 and 40 in adjacent relationship thereto and adapted to form a ribbon of co-extruded food material 50 comprising an outer layer of moldable food material 32, and an inner layer of filling food material 30.

Referring now to FIGS. 4a through 5e, cutter-shaper-sealer assembly 14 is illustrated. First and second rotatably mounted cylinders 52 and 54, respectively, are positioned within cutter-shaper-sealer assembly 14. Second rotatably mounted cylinder 54 is positioned in adjacent contacting relationship to first cylinder 52 and adapted to rotate in an opposite direction with respect to the rotational movement of first cylinder 52.

Figure 5A:
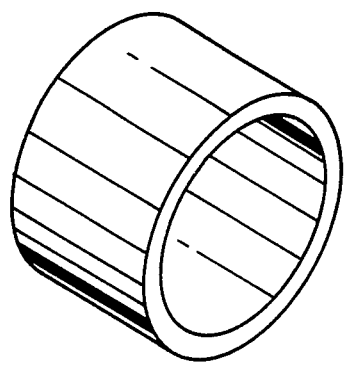
FIG. 5a illustrates the second rotatably mounted cylinder of the cutting means in its perspective view.
Figure 5B:
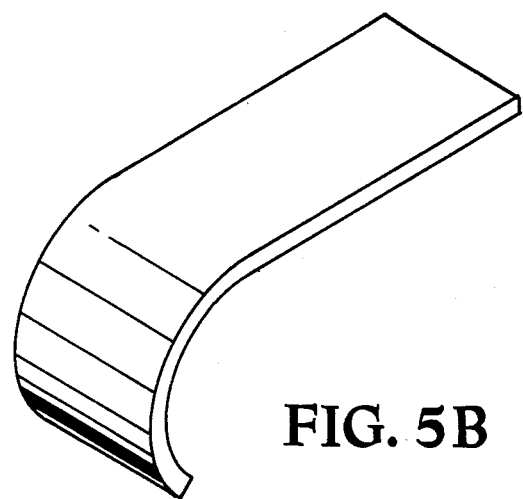
FIG. 5b illustrates the second rotatably mounted cylinder of FIG. 5a in an unraveled position to show its surface.

With specific reference to FIGS. 5a and 5b, the surface of second rotatably mounted cylinder 54 is illustrated. As shown, cylinder 54 is a hollow member defined by a wrapped piece of a suitable material including but not limited to stainless steel, brass and the like. Similarly, cylinder 52 is also a hollow cylinder with significant surface variations as more fully explained hereafter.

Figure 5C:
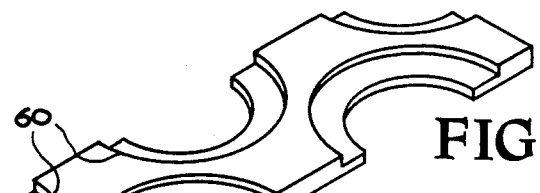
FIGS. 5c, 5d and 5e illustrate perspectively various embodiments of unraveled surfaces of the first rotatably mounted cylinder of the cutting means.
Figure 5D:
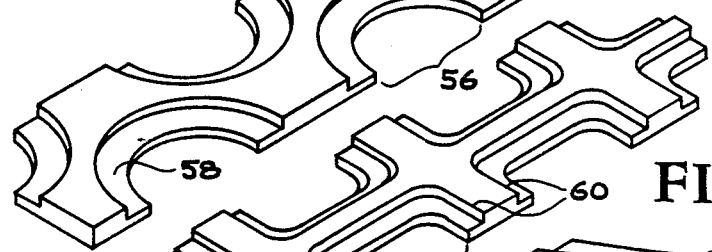
Figure 5E:
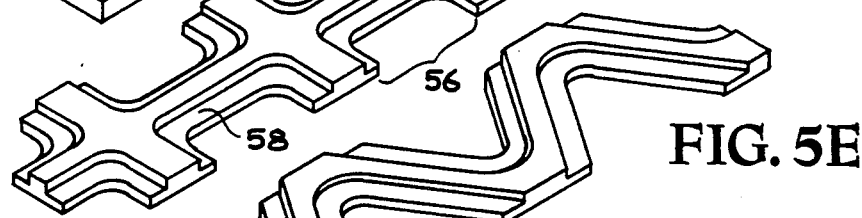

With specific reference to FIGS. 5c through 5e, the surface of first rotatably mounted cylinder 52 is illustrated in three embodiments. Cylinder 52 has a surface which includes a plurality of hollow wells 56 with an indentation 58 formed around the periphery of each well. Both sides of the surface include wells 56, and each well is spaced apart a predetermined distance 60 so as to prevent waste of food product.

Figure 4B:
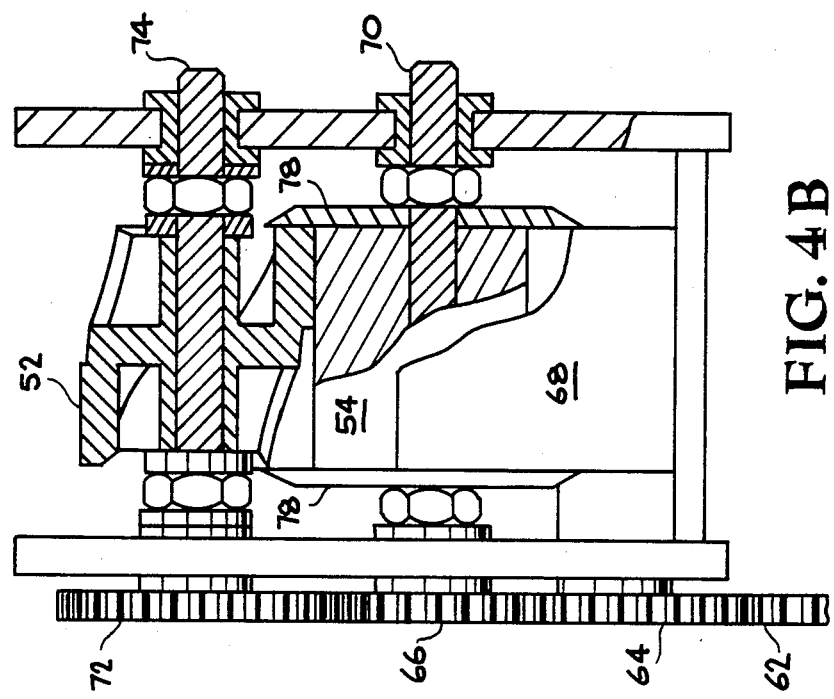
Figure 4A:
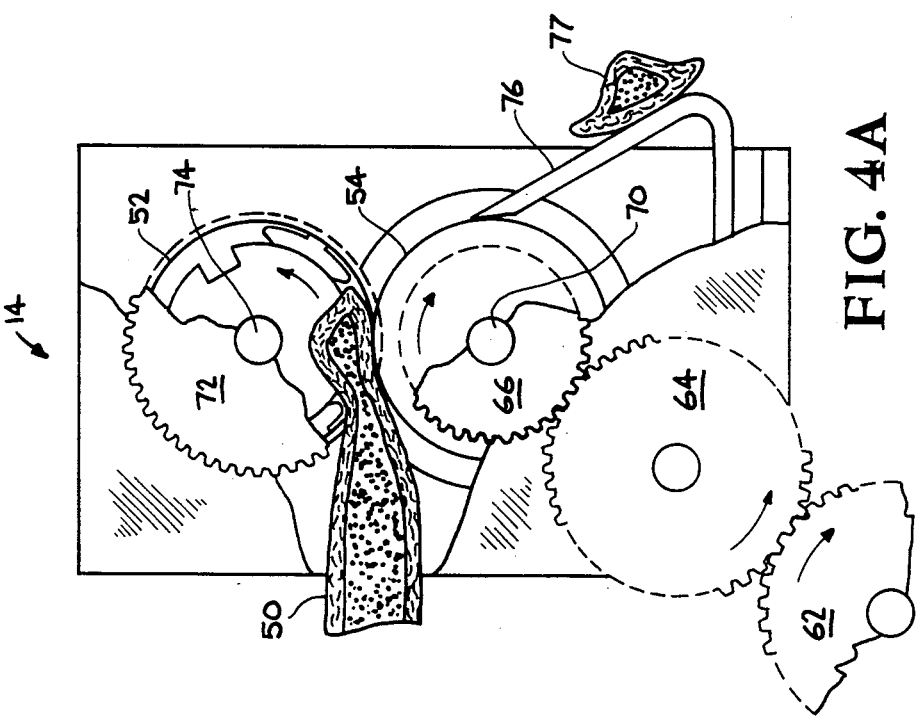
FIG. 4a is a cross-sectional view of the means for continuously shaping, cutting and sealing the wrapped food product of FIG. 2.

A plurality of gears are emplaced to provide for the movement of cylinders 52 and 54 (FIGS. 4a and 4b). As shown, a first gear 62 drives a second gear 64 which in turn drives a third gear 66. Third gear 66 is operatively connected to second cylinder 54 by a shaft 70. Third gear 66 also engages a fourth gear 72 which is operatively connected to first cylinder 52 by a shaft 74. The arrangement of gears 66 and 72 is such that second cylinder 54 and first cylinder 52 rotate in opposite directions.

Means are included for coordinating the movement of food materials through tubular barrels 38 and 40 (the operation of first and second screw feed members 42 and 44) with the rotational movement of cylinders 52 and 54. A shaft 45 (FIG. 3) operatively connects the assembly of bolts, shafts, gears and belts which drive screw feed members 42 and 44 (FIG. 3) with motor means 46 and with gear 62 (FIG. 4a).

In a different embodiment from that illustrated in FIGS. 2–5, a second motor means is employed to drive gear 62. To provide the coordinated movement of food materials with shaping, cutting and sealing, power generation rates are adapted to ensure coordinated non-interrupted movement.

Cylinders 52 and 54 are adapted to receive the ribbon of food material 50. As cylinders 52 and 54 rotate, their rotatable movement pulls ribbon 50 and squeezes it so that extruded ribbon 50 is forced into wells 56, shaped, sealed and cut by indentations 58 to produce the final wrapped food product 77. The surface of cylinder 54 serves as a cutting surface. No waste of food material occurs during the cutting, forming, sealing operation.

Means are included for removing the final food product 77 from cutter-shaper-sealer assembly 14 after it has been formed. Such means includes but is not limited to a doctor blade 76 (FIG. 4a) positioned within cutter-shaper-sealer assembly 14 and adapted to touch the surface of second cylinder 54. A pair of plates 78 (FIG. 4b) is positioned adjacent and fixably mounted to second cylinder 54 and serves to guide the filled ribbon of food material 50 into wells 56.

Figure 6:
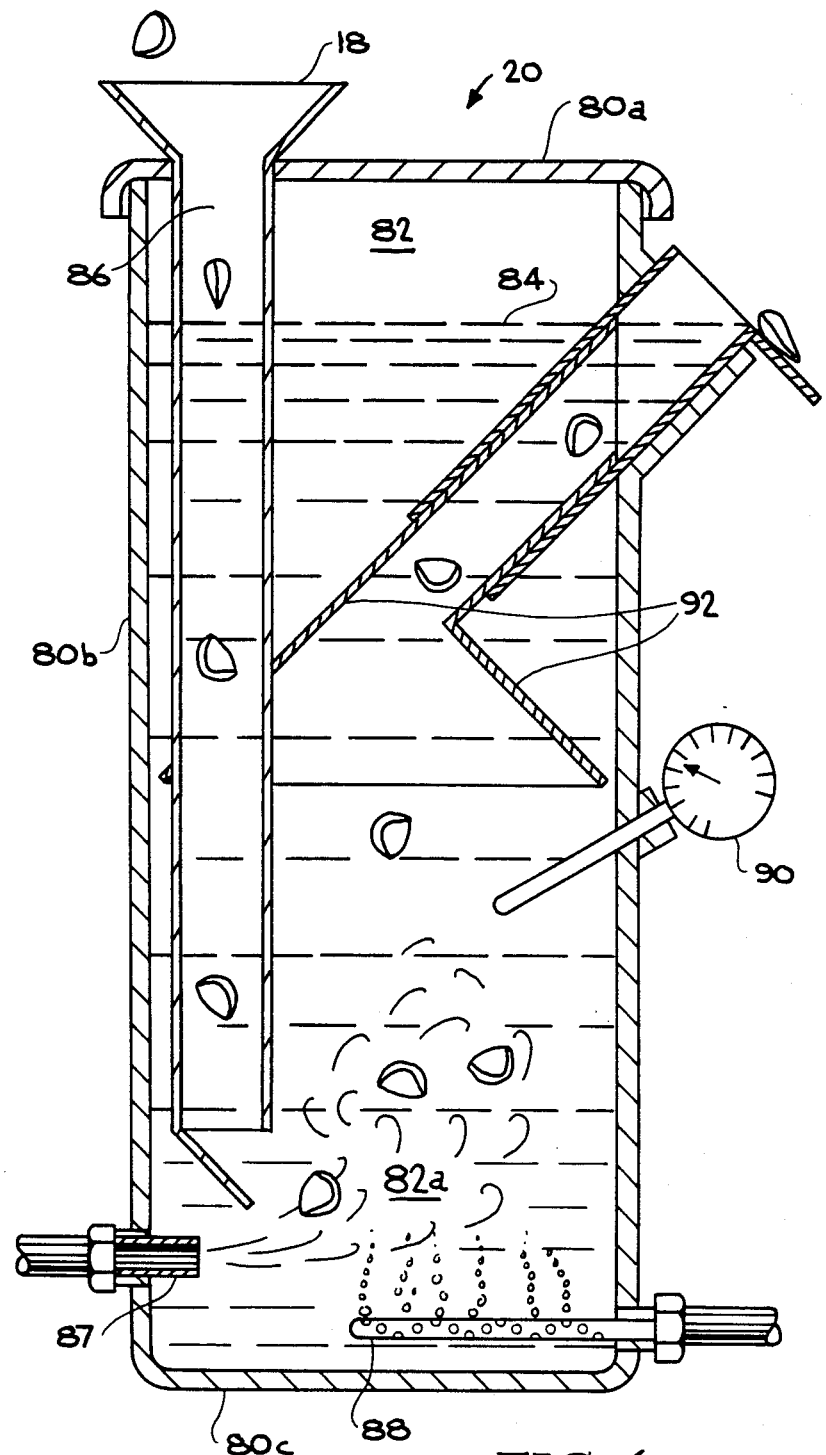
FIG. 6 illustrates a cross-sectional view of the cooking means shown in FIG. 2.

With reference now to FIG. 6, the continuous cooker assembly 20 is illustrated in detail. Top, side wall and bottom members 80a, 80b and 80c, respectively, define a cooking chamber 82 which houses a cooking solution 84. An elongated entrance tube 86 (in this illustrated embodiment a feed funnel) extends through top wall member 80a and extends within the chamber to open into a bottom section 82a of the chamber. Also extending into bottom section 82a is a conduit 87 adapted to receive cooking fluid from a pumping source (not shown) and introduce the same into the chamber. As the cooking fluid is introduced therein through conduit 87, a turbulent motion is created therein. Means for heating cooking solution 84 disposed within chamber 82 is included. Such means include but is not limited to an injector 88 operatively connected to chamber 82 and to a source of vaporized heating material (not shown). For example, if the heating solution is water, steam is introduced. A thermometer 90 is operatively positioned within chamber 82 and provides a measurement of temperature therein.

As the final wrapped food product enters entrance tube 86, it falls through the tube and passes into bottom section 82a of chamber 82. Turbulent motion generated therein provides for a stirring effect within chamber 82. The tuburlent motion is generated by the introduction of gas, steam, etc. As the final food product becomes cooked, it begins to rise within chamber 82 in a direction away from bottom section 82a and rises towards top wall 80a. Means are included for directing the cooked food product out of chamber 82. Such means include but are not limited to an inverted funnel 92 positioned within chamber 82 and extending through wall 80b which allows the product to float out through side wall 80b. In this manner, the cooked final wrapped food product begins an upward movement and exits from chamber 82. The design of cooker assembly 20 provides for the continuous cooking of the final wrapped food product without interruption of the previous co-extrusion, shaping, cutting and sealing operation.

The present invention provides for the continuous production of a co-extruded wrapped food product. A ribbon of food material (comprising a filling food material and an outer surrounding moldable food material) is co-extruded. It is then shaped, cut and sealed in a single continuous step to form a wrapped food product without any waste. The wrapped (and sealed) food product is directed to either a continuous freezer or a continuous cooking assembly where the wrapped food product is cooked to the desired level.

The foregoing description of preferred embodiments of the present invention has been presented for purposes of illustration and description. It is not intended to be exhaustive or to limit the invention to the precise form disclosed, and obviously modifications and variations are possible in light of the above teaching. The embodiments were chosen and described in order to best explain the principles of the invention and their practical applications, to thereby enable others skilled in the art to best utilize the invention in various embodiments and with various modifications as are suited to the particular use contemplated. It is intended that the scope of the invention be defined by the claims appended hereto.

We claim:

1. An apparatus for continuously producing a wrapped food product, comprising a filling food material surrounded by a moldable food material, said apparatus comprising:

a double barrel extruder member having an inner elongated tubular barrel arranged substantially centrally within an elongated surrounding outer tubular barrel;

a first hopper adapted to supply said filling food material to said inner tubular barrel;

a second hopper adapted to supply said moldable food material to said surrounding outer tubular barrel;

feeding means for continuously moving said food materials from each of said hoppers through each of said tubes respectively to an end of each of said tubular barrels to form a filled ribbon of food material;

means for continuously shaping, cutting and sealing said ribbon to form said wrapped food product, said shaping, cutting and sealing means being positioned adjacent said feeding means, and adapted to receive said ribbon of food material and continuously shape, cut and seal to form said wrapped food product; and cooking means operatively connected to a moving means operatively associated with said shaping means, said cooking means comprising, top, bottom and side wall members defining a cooking chamber housing a cooking solution, an elongated entrance tube extending through said top wall member and into said chamber, said elongated entrance tube being adapted to receive a wrapped food product from said moving means and directing it to a bottom section of said chamber, means for creating turbulence in said bottom section of said chamber, means for introducing a heated cooking solution into said chamber, and means for directing a cooked wrapped food product out of a top section of said chamber.

2. The apparatus according to claim 1, wherein said means for directing a cooked wrapped food product out of said chamber comprises an inverted funnel positioned within said chamber.

* * * * *